United States Patent
Urakawa

(10) Patent No.: US 10,095,407 B2
(45) Date of Patent: Oct. 9, 2018

(54) INPUT DEVICE AND COMPUTER-READABLE RECORDING MEDIUM CONTAINING PROGRAM EXECUTED BY THE INPUT DEVICE

(75) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 204 days.

(21) Appl. No.: 13/433,243

(22) Filed: Mar. 28, 2012

(65) Prior Publication Data

US 2012/0326964 A1  Dec. 27, 2012

(30) Foreign Application Priority Data

Jun. 23, 2011 (JP) ................................. 2011-139095

(51) Int. Cl.
*G06F 3/0488* (2013.01)
*H04N 1/00* (2006.01)

(52) U.S. Cl.
CPC ...... *G06F 3/04886* (2013.01); *H04N 1/00411* (2013.01); *H04N 2201/0094* (2013.01)

(58) Field of Classification Search
None
See application file for complete search history.

(56) References Cited

U.S. PATENT DOCUMENTS 5,959,629 A * 9/1999 Masui .......................... 715/808
6,107,997 A * 8/2000 Ure .............................. 345/173

(Continued)

FOREIGN PATENT DOCUMENTS

CN  101256447 A  9/2008
CN  101398715 A  4/2009

(Continued)

OTHER PUBLICATIONS

Office Action issued in related Chinese Patent Application No. 201210075887.1, dated Dec. 10, 2014.

(Continued)

*Primary Examiner* — Jennifer Mehmood
*Assistant Examiner* — Parul Gupta
(74) *Attorney, Agent, or Firm* — Merchant & Gould P.C.

(57) ABSTRACT

A character input device, including: a display control section to display, in a first region, an operational-element group composed of operational elements corresponding to characters and to display, in a second region, another operational-element group composed of operational elements corresponding to characters, the characters corresponding to the respective operational-element groups displayed in the first and the second regions being different in type; a first input processing section to perform, upon detection of an operation on the first region, input processing of a character specified by the operation, among the characters to which the operational elements of the operational-element group displayed in the first region correspond; and a second input processing section to perform, upon detection of an operation on the second region, input processing of a character specified by the operation, among the characters to which the operational elements of the operational-element group displayed in the second region correspond.

5 Claims, 7 Drawing Sheets

(56) References Cited

U.S. PATENT DOCUMENTS

| | | | |
|---|---|---|---|
| 6,798,400 B2* | 9/2004 | Fujimoto | G06F 3/0489 345/168 |
| 7,020,587 B1* | 3/2006 | Di | G06F 17/27 703/2 |
| 2003/0074647 A1* | 4/2003 | Andrew | G06F 9/4443 717/100 |
| 2005/0273724 A1* | 12/2005 | Joeressen | G06F 3/0236 715/773 |
| 2006/0136226 A1* | 6/2006 | Emam | H04N 5/222 704/277 |
| 2006/0282791 A1* | 12/2006 | Bogomolov | G06F 3/0236 715/773 |
| 2007/0013673 A1* | 1/2007 | Minari | G06F 3/04886 345/173 |
| 2007/0237310 A1* | 10/2007 | Schmiedlin | G06F 3/0237 379/88.01 |
| 2009/0195506 A1 | 8/2009 | Geidl et al. | |

FOREIGN PATENT DOCUMENTS

| | | | |
|---|---|---|---|
| EP | 0 844 570 A2 | 5/1998 |
| EP | 1 260 900 A2 | 11/2002 |
| JP | H04-021115 A | 1/1992 |
| JP | H05-108239 A | 4/1993 |
| JP | 11-133816 | 5/1999 |
| JP | 2001-356870 A | 12/2001 |
| JP | 2007-025808 A | 2/2007 |
| JP | 2007-150749 A | 6/2007 |
| JP | 2010-034857 A | 2/2010 |
| JP | 2011-511370 A | 4/2011 |

OTHER PUBLICATIONS

Office Action issued in related Japanese Patent Application No. 2011-139095, dated Dec. 2, 2014.

Office Action issued in related Japanese Patent Application No. 2011-139095, dated Jun. 9, 2015.

Chinese Office Action issued in related application CN 201210075887.1, dated Aug. 13, 2015.

* cited by examiner

FIG.3

KEY DETERMINATION TABLE 11b

| INPUT ITEM | FIRST SOFT KEYBOARD | | | | SECOND SOFT KEYBOARD | | |
|---|---|---|---|---|---|---|---|
| | ENGLISH LETTERS | NUMERALS | SYMBOLS | DEFAULT | FIRST SOFT KEYBOARD: ENGLISH LETTERS | FIRST SOFT KEYBOARD: NUMERALS | FIRST SOFT KEYBOARD: SYMBOLS |
| RSS SITE URL | VALID | VALID | VALID | ENGLISH LETTERS | SYMBOLS | SYMBOLS | NUMERALS |
| PROXY SERVER NAME | VALID | VALID | VALID | NUMERALS | NUMERALS | SYMBOLS | NUMERALS |
| PHONE DIRECTORY USER NAME | VALID | VALID | INVALID | ENGLISH LETTERS | NUMERALS | NUMERALS | NUMERALS |
| PHONE NUMBER | INVALID | VALID | INVALID | NUMERALS | NUMERALS | NUMERALS | NUMERALS |

INPUT DEVICE AND COMPUTER-READABLE RECORDING MEDIUM CONTAINING PROGRAM EXECUTED BY THE INPUT DEVICE

CROSS REFERENCE TO RELATED APPLICATION

The present application claims priority from Japanese Patent Application No. 2011-139095, which was filed on Jun. 23, 2011, the disclosure of which is herein incorporated by reference in its entirety.

BACKGROUND OF THE INVENTION

Field of the Invention

The present invention relates to an input device and a computer-readable recording medium containing a program executed by the input device.

Discussion of Related Art

There has been conventionally known an input device into which directions or commands are inputtable through a touch panel. In the input device, various directions can be inputted through the touch panel by switching a display image in a display portion of the input device. For instance, in a state in which soft keys that represent English letters are displayed on the display portion of the input device, a user can input English letters. By switching the soft keys that represent English letters to soft keys that represent numerals, the user can input numerals.

SUMMARY OF THE INVENTION

Where information composed of various types of characters such as English letters, numerals, symbols and the like is inputted, in other words, where information such as "@abc1d2e3f4" is inputted, for instance, it is necessary to switch soft keys displayed in the display portion every time when the type of characters to be inputted changes to another. This is cumbersome for the user.

It is therefore an object of the invention to provide an input device which ensures good operability and a computer-readable recording medium containing a program executed by the input device.

The above-indicated object of the invention may be attained according to a first aspect of the present invention which provides, an input device for inputting characters, comprising:

a display control section configured to display, in a first region, an operational-element group composed of operational elements corresponding to characters and to display, in a second region, another operational-element group composed of operational elements corresponding to characters, the characters to which the operational elements of the operational-element group displayed in the first region correspond and the characters to which the operational elements of the operational-element group displayed in the second region correspond being different from each other in type;

a first input processing section configured such that, where an operation on the first region is detected, the first input processing section carries out input processing of a character specified by the operation, among the characters to which the operational elements of the operational-element group displayed in the first region correspond; and a second input processing section configured such that, where an operation on the second region is detected, the second input processing section carries out input processing of a character specified by the operation, among the characters to which the operational elements of the operational-element group displayed in the second region correspond.

It is noted that the present invention may be realized by a controller for controlling the input device, an inputting method, an input control program for controlling the input device, a recording medium on which the input control program is readably recorded, and so on.

BRIEF DESCRIPTION OF THE DRAWINGS

The above and other objects, features, advantages and technical and industrial significance of the present invention will be better understood by reading the following detailed description of an embodiment of the invention, when considered in connection with the accompanying drawings, in which:

FIG. 3 is a schematic view showing a key determination table;

DETAILED DESCRIPTION OF THE EMBODIMENT

Figure 1:
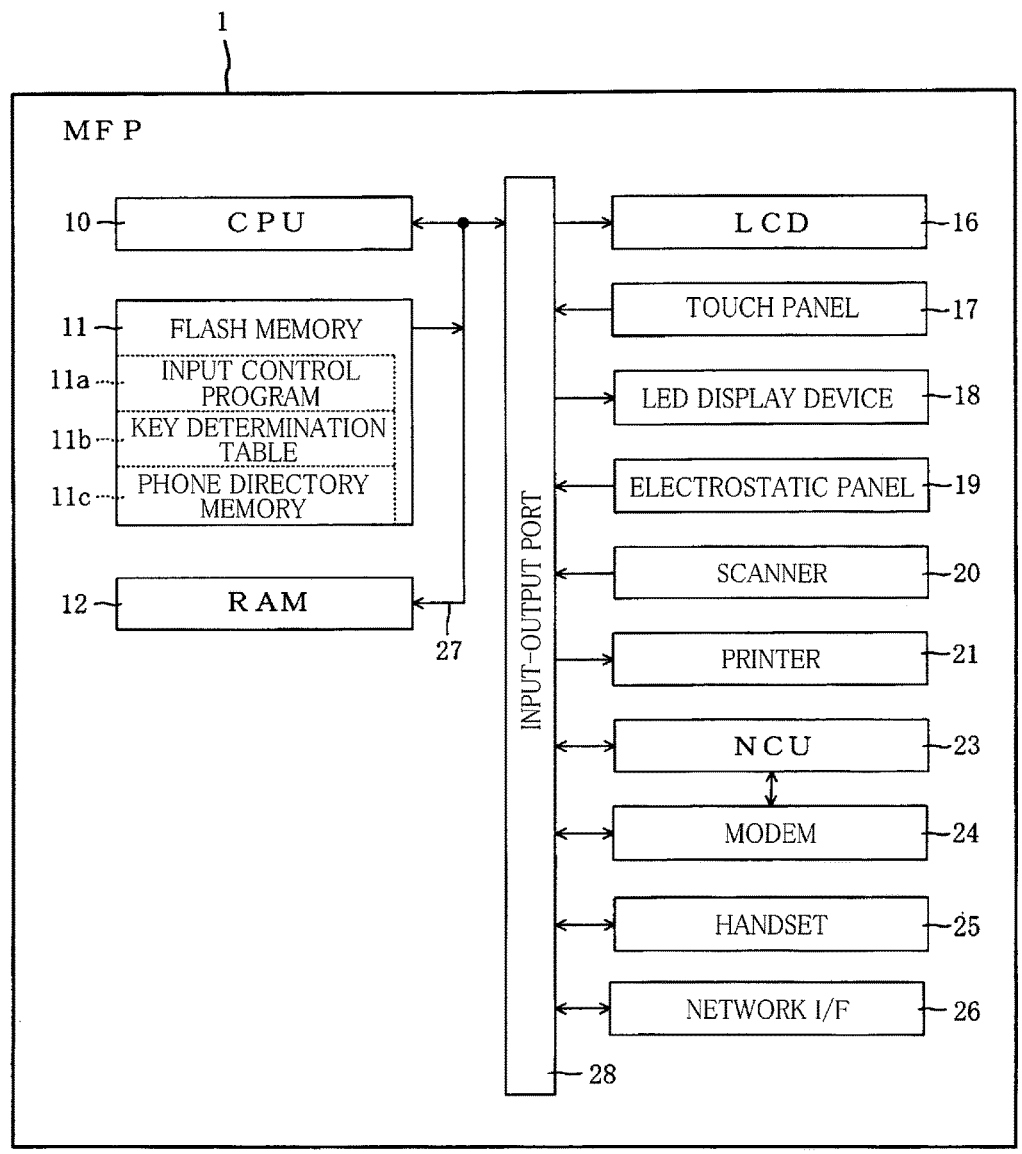
FIG. 1 is a block diagram showing an electric structure of an MFP according to one embodiment of the present invention.

Hereinafter, there will be explained one embodiment of the present invention with reference to the drawings. FIG. 1 is a block diagram showing an electric structure of a Multi Function Peripheral 1 (hereinafter abbreviated as "MFP 1") as an input device according to the embodiment of the invention.

The MFP 1 has various functions such as a facsimile machine, a scanner, a printer, and a telephone. In particular, the MFP 1 of the present embodiment is configured to display two kinds of soft keys side by side, so as to ensure good operability.

The MFP 1 mainly includes a CPU 10, a flash memory 11, a RAM 12, an LCD 16, a touch panel 17, an LED display device 18, an electrostatic panel 19, a scanner 20, a printer 21, an NCU 23, a modem 24, a handset 25, and a network interface 26 (hereinafter referred to as the "network I/F 26"). The CPU 10, the flash memory 11, and the RAM 12 are connected to each other via a bus line 27. Further, the LCD 16, the touch panel 17, the LED display device 18, the electrostatic panel 19, the scanner 20, the printer 21, the NCU 23, the modem 24, the handset 25, the network I/F 26, and the bus line 27 are connected to each other by an input-output port 28.

The CPU 10 is configured to control various functional sections of the MFP 1 and various sections connected to the input-output port 28, in accordance with fixed values and programs stored in the flash memory 11, data stored in the RAM 12, or various signals which are received and transmitted through the NCU 23.

The flash memory 11 is a rewritable nonvolatile memory in which are provided an input control program 11a, a key determination table 11b, a phone directory memory 11c, etc. The CPU 10 is configured to execute main processing shown in FIG. 4 (which will be explained) according to the input control program 11a. The key determination table 11b will be later explained with reference to FIG. 3. In the phone directory memory 11c, there are stored names and phone numbers of users in a phone directory. A user of the MFP 1 refers to the phone number stored in the phone directory memory 11c and dials a person to talk to or sends a facsimile to an intended person. The RAM 12 is a rewritable volatile memory.

The LCD 16 is a liquid crystal display device and is configured to display various images such as a first soft keyboard that will be later explained with reference to FIG. 2. Over an entire region of the LCD 16, a resistor-film touch panel 17 is provided. The touch panel 17 is configured to detect a position at which the user operates with an input medium such as a finger and to output coordinate information of the position on the basis of an XY coordinate system in which an origin point corresponds to an upper left corner of the touch panel 17.

The LED display device 18 is a display device to display two kinds of a second soft keyboard by switching lighting patterns of an LED. The second soft keyboard will be later explained with reference to FIG. 2. Over an entire region of the LED display device 18, an electrostatic panel 19 which is a capacitive touch panel is provided. Like the touch panel 17, the electrostatic panel 19 is configured to detect a position at which the user operates and to output coordinate information of the position on the basis of an XY coordinate system in which an origin point corresponds to an upper left corner of the electrostatic panel 19.

The scanner 20 performs a reading operation in which a document is read so as to be converted into electronic data. The printer 21 performs a printing operation for printing an image on a recording sheet. The NCU 23 is configured to control telephone lines. The modem 24 is configured to modulate transmission signals in facsimile transmission and to demodulate received modulation signals in facsimile reception. The handset 25 is for telephone communication with external equipment. The network I/F 26 is an interface for connecting the MFP 1 to internet or LAN (not shown).

Referring next to FIG. 2, there will be explained a character-input-acceptance state in the MFP 1. In the present specification, "characters" refer to various figures, such as letters, numerals, and symbols, used for transmitting information. A "character-input-acceptance state" refers to a state in which input of characters are acceptable for a certain input item such as the user name in the phone directory (i.e., the phone directory user name) and the phone number to be stored in the phone directory memory 11c. FIG. 2 shows examples of an input screen and a sub screen displayed in the character-input-acceptance state.

Figure 2A:
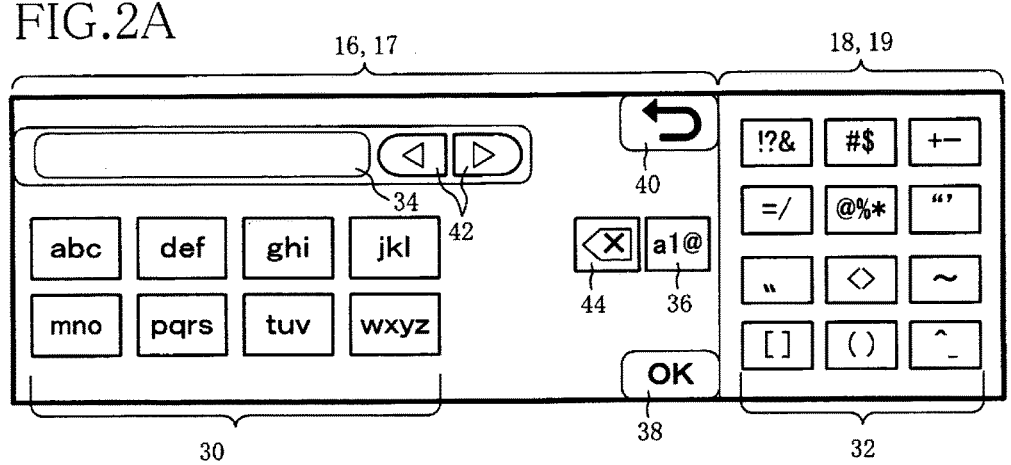
FIG. 2 is a view showing an input screen.

In the character-input-acceptance state, the MFP 1 permits the LCD 16 to display the input screen. The input screen includes the first soft keyboard 30 in which is displayed an operational-element group composed of a plurality of operational elements each corresponding to at least one character. Further, the MFP 1 permits the LED display device 18 to display the sub screen. The sub screen includes a second soft keyboard 32 in which is displayed an operational-element group composed of a plurality of operational elements each corresponding to at least one character. Where an operational-element group composed of operational elements corresponding to English letters shown in FIG. 2A is displayed in the first soft keyboard 30, for instance, an operational-element group composed of operational elements corresponding to symbols are displayed in the second soft keyboard 32, for instance. Thus, the characters to which the operational elements of the operational-element group displayed in the first soft keyboard 30 correspond differ in type from the characters to which the operational elements of the operational-element group displayed in the second soft keyboard 32 correspond. In the present embodiment, one operational element corresponds to one "key" in the "soft keyboard". Accordingly, the "operational element" and the "operational-element group" will be hereinafter referred to as a "key" and a "key group", respectively. A "type of the characters to which the operational elements that constitute the operational-element group correspond" will be simply referred to as a "type of the key group" or a "type of the keys in the key group". Further, the operational-element groups which differ from each other in type of characters to which the operational elements of the respective operational-element groups correspond will be referred to as "key groups which differ from each other in type".

The type of the key group to be displayed in each of the first soft keyboard 30 and the second soft keyboard 32 is determined by a designer of the MFP 1. In the present embodiment, as the type of the key group to be displayed in the first soft keyboard 30, English letters, numerals, and symbols are prepared. As the type of the key group to be displayed in the second soft keyboard 32, numerals and symbols are prepared. Besides, other types such as hiragana, Chinese characters, pictorial symbols may be prepared.

In the state shown in FIG. 2A, where an operation on the first soft keyboard 30 is detected by the touch panel 17, the MFP 1 executes input processing of inputting an English letter specified by the operation. For instance, where a region of the first soft keyboard 30 in which English letters "abc" are displayed, namely, a key of the first soft keyboard 30 corresponding to the English letters "abc", is operated once, an English character "a" specified by the operation is inputted. Where the same region is operated twice, an English character "b" is inputted. Where the same region is operated three times, an English character "c" is inputted.

On the other hand, where an operation on the second soft keyboard 32 is detected by the electrostatic panel 19, the MFP 1 executes input processing of inputting a symbol/symbols on the basis of the operated region and a number of times of the operations. The MFP 1 sequentially displays, in an input box 34 in the LCD 16, letters, numerals, and symbols inputted by the operations on the first soft keyboard 30 and the second soft keyboard 3.

According to the MFP 1 of the present embodiment, the key group which differs in type from the key group of the first soft keyboard 30 is displayed in the second soft keyboard 32. Accordingly, the user can input a plurality of types of characters, so that good operability is ensured. Even where a character string to be inputted is the one containing symbols and English letters such as "@abc&d", for instance, the user can input the intended character string by utilizing the first soft keyboard 30 and the second soft keyboard 32, without switching the type of the keys displayed in the first soft keyboard 30 to another.

Figure 2B:
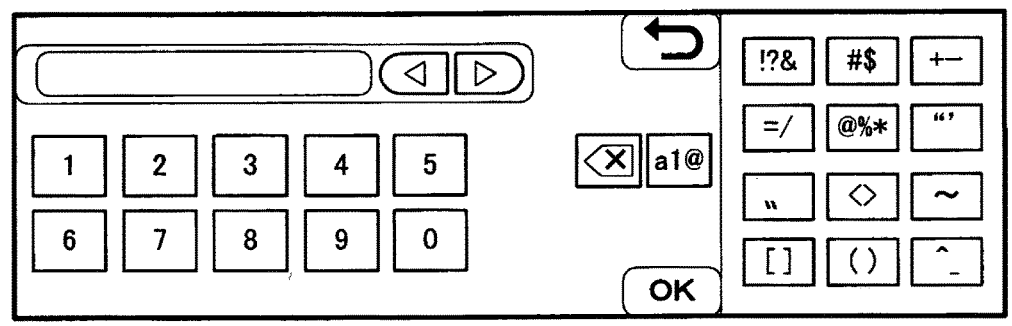
Figure 2C:
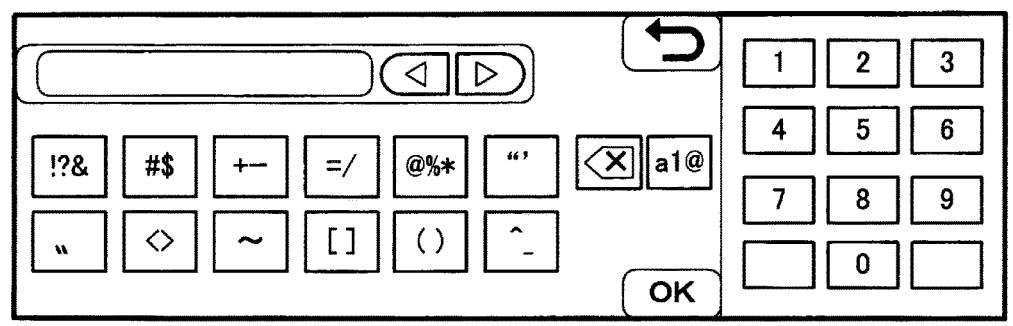

In the input screen of the LCD 16, there is further displayed a type switching key 36 for accepting a request for changing the type of the key group displayed in the first soft keyboard 30 to another. The request will be hereinafter referred to as the "change request" where appropriate. Where an operation on the type switching key 36 is detected by the touch panel 17, that is, where the change request for changing the type of the key group displayed in the first soft keyboard 30 is accepted, the MFP 1 changes the type of the key group displayed in the first soft keyboard 30. Where the type switching key 36 is operated once in the state shown in FIG. 2A, for instance, the type of the key group displayed in the first soft keyboard 30 is changed from English letters to numerals, as shown in FIG. 2B. Where the type switching key 36 is operated twice, the type of the key group displayed in the first soft keyboard 30 is changed from English letters to symbols as shown in FIG. 2C. In this instance, the MFP 1 changes the key group displayed in the second soft keyboard 32 to another key group (corresponding to numerals, for instance) which differs in type from the changed key group (corresponding to symbols, for instance) displayed in the first soft keyboard 30.

According to the MFP 1 of the present embodiment, therefore, the type of the key group displayed in the first soft keyboard 30 can be changed to a desired type by the operation on the type switching key 36 by the user. Further, in an instance where the type of the key group displayed in the first soft keyboard 30 is changed, the type of the key group displayed in the second soft keyboard 32 is also changed. Accordingly, two types of characters can be always inputted, thereby ensuring good operability. Moreover, in an instance where inputting through the second soft keyboard 32 continues and the user feels that the operation on the second soft keyboard 32 is cumbersome, the user may change the type of the key group displayed in the first soft keyboard 30 by the type switching key 36, thereby enabling the user to input without using the second soft keyboard 32.

In the input screen of the LCD 16, there are further provided an enter key 38, a back key 40, a cursor-movement key 42, and a delete key 44, as shown in FIG. 2. Where the enter key 38 is operated, the MFP 1 stores the character string displayed in the input box 34 as set data, in the phone directory memory 11c, for instance. Where the back key 40 is operated, the MFP 1 changes current display in the input screen of the LCD 16 back to previous display that is immediately before the current display. Where the cursor-movement key 42 is operated, the MFP 1 moves a cursor (not shown) in the input box 34. Where the delete key 44 is operated, the MFP 1 deletes one character in the input box 34.

FIG. 3 is a view schematically showing the key determination table 11b. In the key determination table 11b, the type of the keys to be displayed in each of the first soft keyboard 30 and the second soft keyboard 32 is set for each of input items. Where the MFP 1 establishes the character-input-acceptance state in which input of characters for any one of the plurality of input items is acceptable, the MFP 1 displays, in the first soft keyboard 30, the key group corresponding to the character-input-acceptance state.

Where an input screen for an input item "RSS site URL" is displayed, the key group corresponding to English letters as a default type is displayed in the first soft keyboard 30, on the basis of the key determination table 11b. Where characters for the RSS site URL are inputted, there is a possibility that any of English letters, numerals, and symbols are inputted. Therefore, all of English letters, numerals, and symbols are made valid or enabled as the type of the keys (i.e., the type of the key group) to be displayed in the first soft keyboard 30 corresponding to the input item "RSS site URL". Accordingly, every time when the type switching key 36 is operated by the user, the MFP 1 switches the type of the keys displayed in the first soft keyboard 30 in the order of English letters, numerals, and symbols.

Where an input screen for an input item "phone directory user name" is displayed, the key group corresponding to English letters as a default type is displayed in the first soft keyboard 30, on the basis of the key determination table 11b. Where characters for the phone directory user name are inputted, there is a possibility that English letters and numerals are inputted. Therefore, English letters and numerals are made valid or enabled while symbols are made invalid or disabled, as the type of the keys (i.e., the type of the key group) to be displayed in the first soft keyboard 30 corresponding to the input item "phone directory user name". Accordingly, every time when the type switching key 36 is operated by the user, the MFP 1 switches the type of the keys displayed in the first soft keyboard 30 in the order of English letters and numerals.

Thus, it is possible to display, in the first soft keyboard 30, the keys whose type is suitable for a certain input item, on the basis of the key determination table 11b. In other words, it is possible to display, in the first soft keyboard 30, only the keys corresponding to the characters which are to be frequently inputted for the input item in question. Therefore, the number of times the user operates the type switching key 36 can be reduced, thereby enhancing the operability.

In the key determination table 11b, the type of the key group to be displayed in the second soft keyboard 32 is set for each of the input items and for each of the types of the key group displayed in the first soft keyboard 30. Where the keys corresponding to English letters or numerals are displayed in the first soft keyboard 30 for the input item "RSS site URL", for instance, the keys corresponding to symbols are displayed in the second soft keyboard 32. On the other hand, where the keys corresponding to symbols are displayed in the first soft keyboard 30, the keys corresponding to numerals are displayed in the second soft keyboard 32.

Thus, the type of the key group to be displayed in the second soft keyboard 32 is set in advance for each of the input items and for each of the types of the key group displayed in the first soft keyboard 30. Accordingly, it is possible to display, in the second soft keyboard 32, the key group which is suitable for a certain input item and which differs in type from the key group displayed in the first soft keyboard 30. As a result, the number of times the user operates the type switching key 36 can be reduced.

Where characters for an input item "phone number" are inputted, there is a high possibility that numerals are inputted. Hence, in the key determination table 11b, only numerals are made valid and English letters and symbols are made invalid, as the type of the keys (i.e., the type of the key group) to be displayed in the first soft keyboard 30 corresponding to the input item "phone number". Further, where the characters for the input item "phone number" are inputted, the type of the keys to be displayed in the second soft keyboard 32 is always set as numerals, irrespective of the type of the keys to be displayed in the first soft keyboard 30. Thus, the key determination table 11b may be designed such that the key groups of the same type may be displayed in the first soft keyboard 30 and the second soft keyboard 32 depending upon a kind of the input items.

As described above, the keys corresponding to symbols and the keys corresponding to numerals can be displayed in the second soft keyboard 32. Depending upon the kind of the input items, the type of the keys to be displayed in the second soft keyboard 32 is only one. For the input items "RSS site URL" and "Proxy server name", there is a possibility that symbols and numerals are inputted. Accordingly, two types of the keys, i.e., symbols and numerals, can be displayed in the second soft keyboard 32 for those two input items. On the other hand, for the input items "phone directory user name" and "phone number", there is no or little possibility that symbols are inputted. Accordingly, only the keys corresponding to numerals can be displayed in the second soft keyboard 32.

Figure 4:
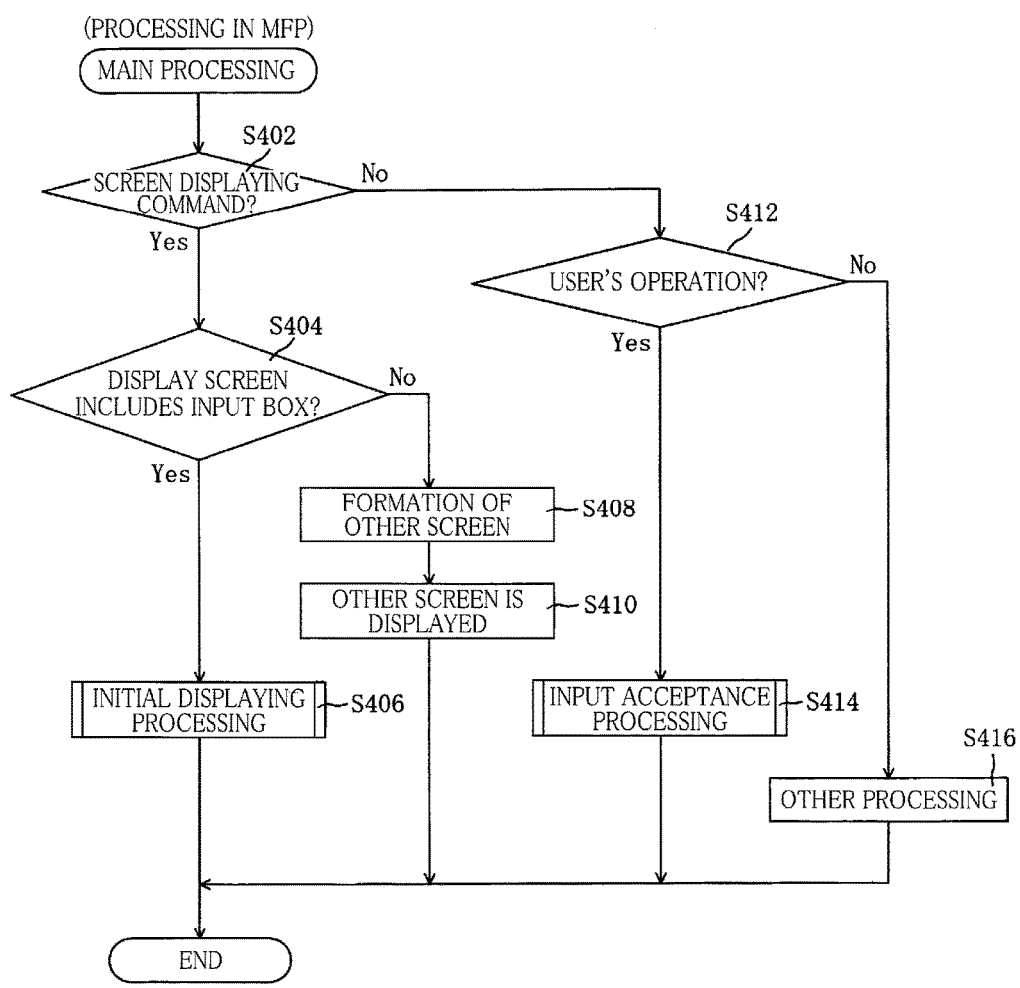
FIG. 4 is a flow chart showing main processing.

FIG. 4 shows a flow chart showing main processing executed by the CPU 10 of the MFP 1 according to the input control program 11a. This main processing is repeatedly executed after power-on of the MFP 1 for startup.

Initially, where a screen displaying command is received (S402: Yes) and the display screen to be displayed based on the command is the input screen including the input box 34 (S404: Yes), the CPU 10 executes initial displaying processing (S406) for displaying the input screen. The initial displaying processing (S406) will be later explained with respect to FIG. 5.

Where the display screen to be displayed based on the screen displaying command is not the input screen (S404: No), the CPU 10 forms other screen to be displayed based on the command (S408) and controls the LCD 16 to display the screen (S410). Then, the main processing is ended.

On the other hand, where the screen displaying command is not received (S402: No) and the user's operation is detected by the touch panel 17 or the electrostatic panel 19 (S412: Yes), the CPU 10 executes input acceptance processing (S414), and the main processing is ended. The input acceptance processing (S414) will be later explained with respect to FIG. 6.

On the other hand, where the screen displaying command is not received (S402: No) and the user's operation is not detected (S412: No), the CPU 10 executes other processing (S416), and the main processing is ended.

Figure 5:
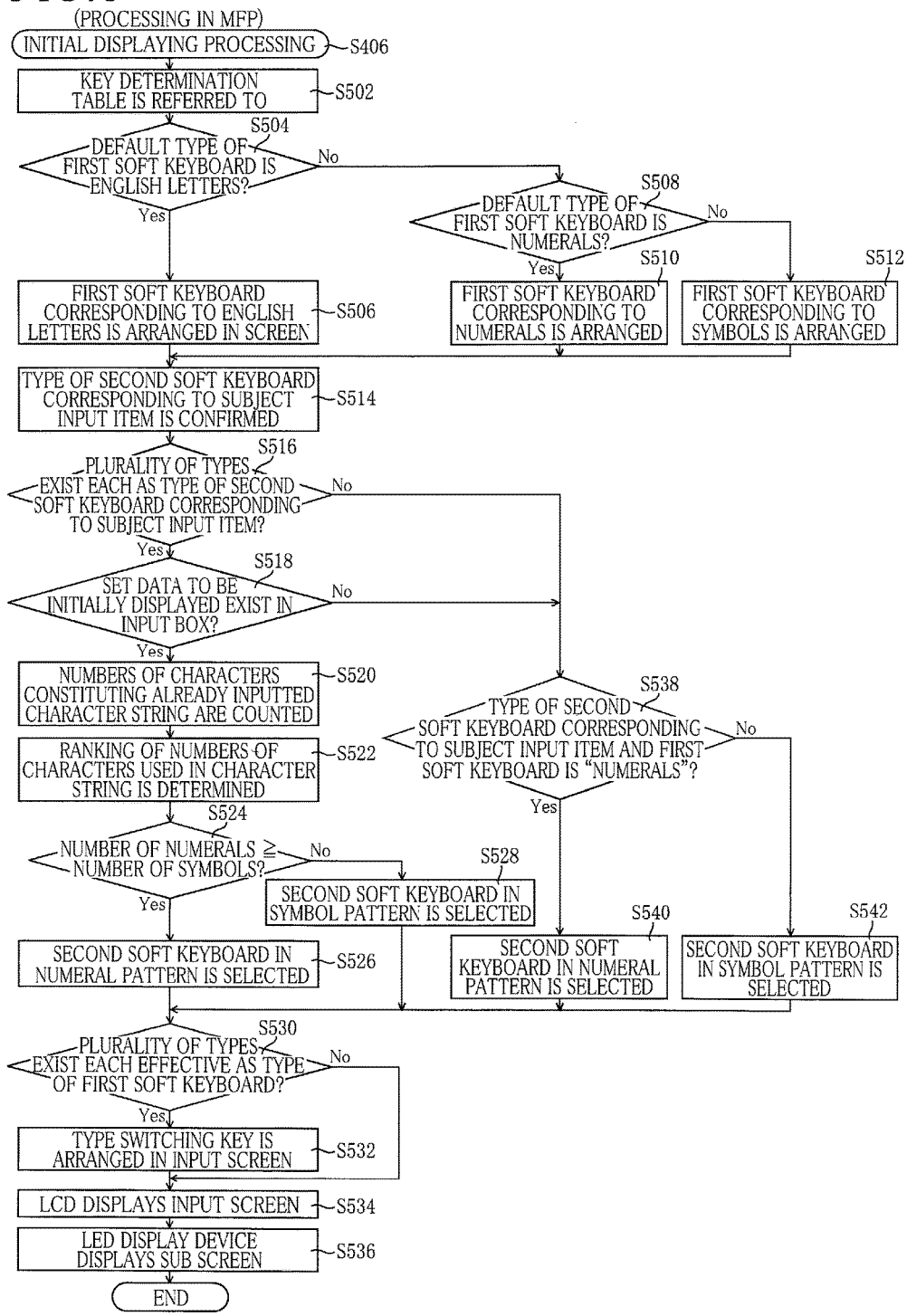
FIG. 5 is a flow chart showing initial displaying processing.

FIG. 5 is a flow chart showing the initial displaying processing (S406). This initial displaying processing is for permitting the LCD 16 to display the input screen and for permitting the LED display device 18 to display the sub screen. The CPU 10 initially refers to the key determination table 11b (S502). Subsequently, the CPU 10 confirms a default type of the first soft keyboard 30 corresponding to the input item for which input is accepted in the input screen to be displayed. (This input item will be hereinafter referred to as the "subject input item" where appropriate. Where the default type of the first soft keyboard 30 is English letters (S504: Yes), the CPU 10 arranges or places the first soft keyboard 30 corresponding to English letters in the input screen drawn in VRAM (not shown) (S506). Where the default type of the first soft keyboard 30 is not English letters (S504: No) and the default type of the first soft keyboard 30 is numerals (S508: Yes), the CPU 10 arranges or places the first soft keyboard 30 corresponding to numerals in the input screen (S510). Where the default type of the first soft keyboard 30 is symbols (S508: No), the CPU 10 arranges or places the first soft keyboard 30 corresponding to symbols in the input screen (S512).

Next, the CPU 10 refers to the key determination table 11b and confirms the type of the keys of the second soft keyboard 32 corresponding to the subject input item (S514). Where there exist a plurality of key groups in mutually different types each as a candidate of the key group to be displayed in the second soft keyboard 32, namely, where symbols and numerals are stored in the key determination table 11b each as the type of the keys of the second soft keyboard 32 which corresponds to the subject input item (S516: Yes) and there exists set data to be initially displayed in the input box 34, namely, there exists already inputted character string for the subject input item (S518: Yes), the CPU 10 determines any one of the candidate key groups as the key group to be displayed in the second soft keyboard 32, on the basis of the already inputted character string.

More specifically, the CPU 10 analyzes the already inputted character string, counts numbers of the characters constituting the character string for respective types (S520), and determines ranking of the numbers of the characters used in the character string (S522).

Where the number of numerals is equal to or larger than the number of symbols in the already inputted character string (S524: Yes), the CPU 10 selects, as an LED lighting pattern of the LED display device 18, the second soft keyboard 32 in numeral pattern (S526). On the other hand, where the number of symbols is larger than the number of numerals (S524: No), the CPU 10 selects, as the LED lighting pattern of the LED display device 18, the second soft keyboard 32 in symbol pattern (S528). It is noted that "the already inputted character string" in the present embodiment means an arrangement or configuration of the characters constituting the set data. Accordingly, where the set data consists of a single character, the single character corresponds to the already inputted character string.

Subsequently, where there exist a plurality of types each effective as the type of the keys of the first soft keyboard 30 corresponding to the input item (S530: Yes), the CPU 10 arranges or places the type switching key 36 on the input screen (S532). On the other hand, where there exists only one type effective as the type of the keys of the first soft keyboard 30 (S530: No), the CPU 10 skips S532. Next, the CPU 10 controls the LCD 16 to display the input screen drawn in the VRAM (S534) and controls the LED display device 18 to display the second soft keyboard 32 in the selected LED lighting pattern by lighting the LED (S536). Then, the processing is ended.

According to the initial displaying processing (S406) described above, in an instance in which the already inputted character string exists and in which there exist a plurality of key groups in mutually different types each as a candidate of the key group to be displayed in the second soft keyboard 32, it is possible to display, in the second soft keyboard 32, the key group in the type with the largest number of the characters used in the already inputted character string, among the candidate key groups. In other words, it is possible to display, in the second soft keyboard 32, the key group whose type corresponds to the type of the characters that are to be probably inputted, thereby ensuring the user good operability.

There will be next explained an instance in which the type of the keys to be displayed in the second soft keyboard 32 corresponding to the subject input item is only one (S516: No) or an instance in which there exist no set data to be initially displayed in the input box 34 (S518: No).

In those instances, the types of the second soft keyboard 32 linked to the subject input item are referred to in the key determination table 11b. Further, among the types of the second soft keyboard 32 that are referred to, the CPU 10 confirms the type of the second soft keyboard 32 linked to the type of the keys displayed in the first soft keyboard 30, namely, the type of the keys of the first soft keyboard 30 arranged in the input screen in any of S506, S510, and S512). Where the confirmed type of the second soft keyboard 32 is numerals (S538: Yes), the CPU 10 selects, as the LED lighting pattern of the LED display device 18, the second soft keyboard 32 in numeral pattern (S540). On the other hand, where the confirmed type of the second soft keyboard 32 is symbols (S538: No), the CPU 10 selects, as the LED lighting pattern of the LED display device 18, the second soft keyboard 32 in symbol pattern (S542).

Thereafter, the CPU 10 controls the LCD 16 to display the input screen (S534) and controls the LED display device 18 to display the second soft keyboard 32 in the selected pattern (S536). Then, the processing is ended.

According to the initial displaying processing (S406), in the MFP 1, the input screen and the sub screen are displayed, and the character-input-acceptance state is established in which the input of the characters for the subject input item is acceptable.

Figure 6:
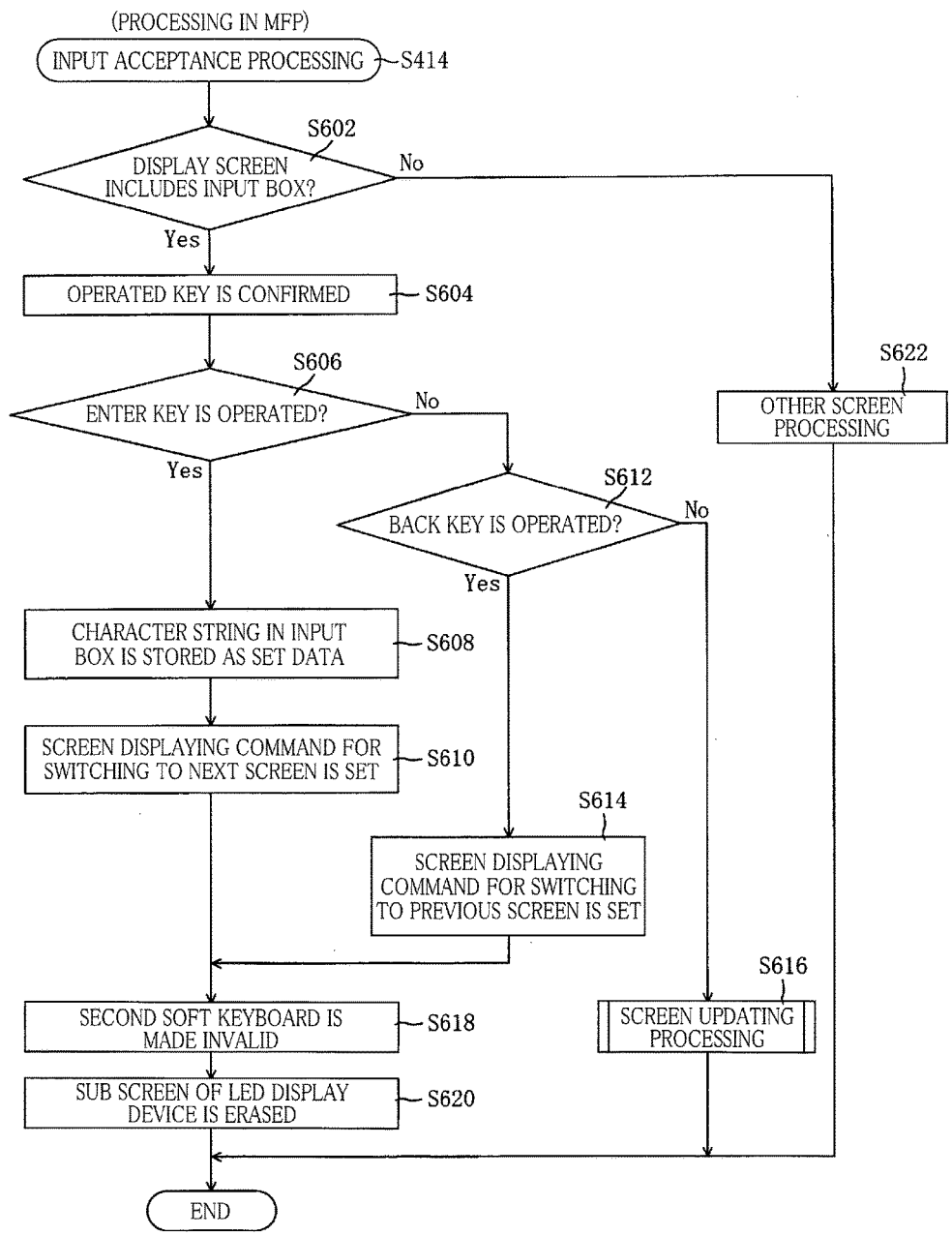
FIG. 6 is a flow chart showing input acceptance processing.

FIG. 6 is a flow chart showing the input acceptance processing (S414). The input acceptance processing is executed when the user's operation is detected by the touch panel 17 or the electrostatic panel 19.

Initially, where the display screen of the LCD 16 is the input screen including the input box 34 (S602: Yes), the CPU 10 confirms the key operated by the user (S604). Where the operated key is the enter key 38 (S606: Yes), the CPU 10 permits the character string displayed in the input box 34 to be stored in the flash memory 11 as the set data, so as to be linked to the input item (S608). For instance, where the subject input item is the phone directory user name, the CPU 10 permits the character string displayed in the input box 34 to be stored in the phone directory memory 11c as the set data of the phone directory user name. Subsequently, the CPU 10 sets the screen displaying command for switching to the next screen (S610) and makes the second soft keyboard 32 invalid (S618). Thereafter, the CPU 10 controls the LED display device 18 to erase the sub screen by turning off the LED (S620), and the processing is ended. By thus providing a period during which the user's touch is not acceptable when the second soft keyboard 32 is switched, the user easily recognizes that his/her touch on the second soft keyboard 32 is accepted as the touch before switching or as the touch after switching.

On the other hand, where the enter key 38 is not operated (S606: No) and the operation on the back key 40 is detected by the touch panel 17 (S612: Yes), the CPU 10 sets the screen displaying command for switching to the previous screen (S614), makes the second soft keyboard 32 invalid (S618), and erases the sub screen of the LED display device 18 (S620).

Where an operation other than the operation on the enter key 38 or the back key 40 is made (S612: No), the CPU 10 executes screen updating processing (S616), and the present processing is ended. The screen updating processing will be explained with reference to FIG. 7. Where the display screen of the LCD 16 is not the input screen (S602: No), the CPU 10 executes other screen processing (S622), and the present processing is ended.

Figure 7:
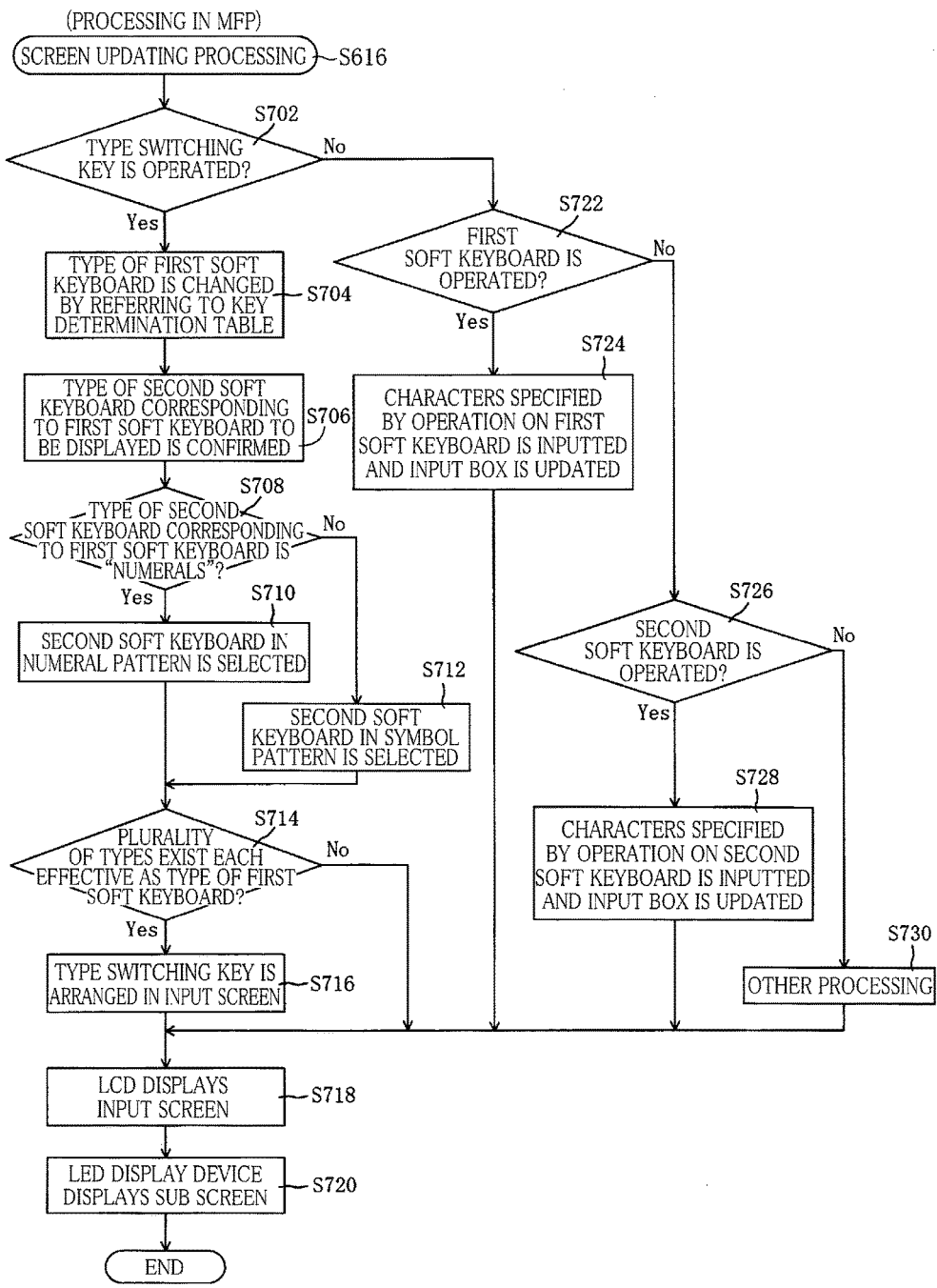
FIG. 7 is a flow chart showing screen updating processing.

FIG. 7 is a flow chart showing the screen updating processing (S616). This processing is executed when the type switching key 36, the first soft keyboard 30, the second soft keyboard 32, etc., are operated. Where the operation on the type switching key 36 is detected by the touch panel 17 (S702: Yes), namely, where the change request for changing the type of the key group to be displayed in the first soft keyboard 30 is accepted, the CPU 10 refers to the key determination table 11b and changes the type of the key group to be displayed in the first soft keyboard 30. More specifically, the CPU 10 selects an effective type of the key group among the types of the key group to be displayed in first soft keyboard 30 which correspond to the subject input item and arranges the first soft keyboard 30 in the selected type, in the input screen drawn in the VRAM (S704).

Subsequently, the CPU 10 refers to the key determination table 11b and confirms the type of the keys to be displayed in the second soft keyboard 32 which is linked to the subject input item and the type of the keys to be displayed in the first soft keyboard 30 (S706). Where the type of the keys to be displayed in the second soft keyboard 32 is numerals (S708: Yes), the CPU 10 selects, as the LED lighting pattern of the LED display device 18, the second soft keyboard 32 in numeral pattern (S710). On the other hand, where the type of the keys to be displayed in the second soft keyboard 32 is symbols (S708: No), the CPU 10 selects, as the LED lighting pattern of the LED display device 18, the second soft keyboard 32 in symbol pattern (S712). Thus, the type of the key group to be displayed in the second soft keyboard 32 is changed.

Subsequently, where there exist a plurality of types each effective as the type of the keys of the first soft keyboard 30 corresponding to the subject input item (S714: Yes), the CPU 10 arranges the type switching key 36 in the input screen (S716). On the other hand, where there exists only one type effective as the type of the keys of the first soft keyboard 3 (S714: No), the CPU 10 skips S716. Next, the CPU 10 controls the LCD 16 to display the input screen drawn in the VRAM (S718) and controls the LED display device 18 to display the sub screen of the second soft keyboard 32 in the selected LED lighting pattern by lighting the LED (S720). Then, the processing is ended.

On the other hand, where the type switching key 36 is not operated (S702: No) and the operation on the first soft keyboard 30 is detected by the touch panel 17 (S722: Yes), the CPU 10 executes input processing of character which is specified by the operation and which corresponds to the key of the key group displayed in the first soft keyboard 30. The CPU 10 then updates the character string in the input box 34, on the basis of the coordinate information outputted by the touch panel 17 and the number of times of the operations (S724).

On the other hand, where the first soft keyboard 30 is not operated (S722: No) and the operation on the second soft keyboard 32 is detected by the electrostatic panel 19 (S726: Yes), the CPU 10 executes inputting processing of the character specified by the operation and updates the character string in the input box 34 (S728). Where other operation, such as an operation on the cursor-movement key 42 or the delete key 44 is detected by the touch panel 17 (S726: No), the CPU 10 executes processing in accordance with the detected operation such as moving the cursor position in the input box 34 or deleting the character in the input box 34 (S730). Subsequently, the CPU 10 controls the LCD 16 to display the input screen in which the input box 34 has been updated (S718) and controls the LED display device 18 to display the sub screen (S720). Then, the processing is ended.

In the illustrated embodiment, the MFP 1 is one example of an input device. The first soft keyboard 30 and the second soft keyboard 32 are one example of a first region and one example of a second region, respectively. The touch panel 17 is one example of a first detecting portion for detecting an operation on the first region while the electrostatic panel 19 is one example of a second detecting portion for detecting an operation on the second region. The CPU 10 is one example of a computer. It is noted each of various portions such as the first detecting portion and the second detecting portion may be a discrete hardware component or may be realized by execution of a program in which the CPU 10 executes the processing shown in FIGS. 4-7. Alternatively, each portion may be realized such that the CPU 10 executes other program. For instance, each portion may be realized such that the CPU 10 executes an operating system. Further, each portion may be realized such that the CPU 10 executes a plurality of programs in combination.

Execution of S534, S536, S718, S720 by the CPU 10 realizes one example of a display control section. Execution of S724 by the CPU 10 realizes one example of a first input processing section. Execution of S728 by the CPU 10 realizes one example of a second input processing section. Execution of S406 by the CPU 10 realizes one example of an input-acceptance-state establishing section. Execution of S520 by the CPU 10 realizes one example of a count section. Execution of S532, S716 by the CPU 10 realizes one example of a change-request accepting section. Execution of S704 by the CPU 10 realizes one example of a first change section. Execution of S706 by the CPU 10 realizes one example of a second change section.

While the embodiment of the present invention has been described, it is to be understood that the invention is not limited to the details of the illustrated embodiment, but may be embodied with various other changes and modifications, which may occur to those skilled in the art, without departing from the spirit and scope of the invention defined in the attached claims.

In the illustrated embodiment, the MFP 1 is described as one example of the input device. Each of various devices such as a printer, a scanner, an electronic game machine, and a digital camera may be one example of the input device.

In the illustrated embodiment, the type of the key group to be displayed in the second soft keyboard 32 is determined on the basis of the already inputted character string. In place of or in addition to this, the type of the key group to be displayed in the first keyboard 32 may be determined on the basis of the already inputted character string.

In the illustrated embodiment, the key determination table 11*b* stores the type of the keys to be displayed in each of the first soft keyboard 30 and the second soft keyboard 32, such that the type is linked to the input item. Instead, the type of the keys to be displayed in each of the first soft keyboard 30 and the second soft keyboard 32 may be stored so as to be linked to the character-input-acceptance state or the input screen. More specifically, an identification (ID) may be given to the character-input-acceptance state or the input screen, and the type of the keys to be displayed in each of the first soft keyboard 30 and the second soft keyboard 32 may be stored so as to be linked to the ID. Then, the type of the characters corresponding to the ID of the current character-input-acceptance state or the current input screen may be read, and the key group corresponding to the read type may be displayed in the first soft keyboard 30 or the second soft keyboard 32.

In the illustrated embodiment, the first soft keyboard 30 and the second soft keyboard 32 are displayed in mutually different display devices, i.e., the LCD 16 and the LED display device 18, and the operation on the first soft keyboard 30 and the operation on the second soft keyboard 32 are detected by mutually different detecting devices, i.e., the touch panel 17 and the electrostatic panel 19. The present invention is applicable to an arrangement in which the first soft keyboard 30 and the second soft keyboard 32 are displayed in mutually different regions in a single display device. Further, the present invention is applicable to an arrangement in which the operation on the first soft keyboard 30 and the operation on the second soft keyboard 32 are detected by the same single detecting device. Moreover, the present invention is applicable to an arrangement in which the capacitive touch panel is provided in the LCD 16 while the resistor film touch panel is provided in the LED display device 18.

While, in the illustrated embodiment, both of the first soft keyboard 30 and the second soft keyboard 32 are displayed, only one of the first soft keyboard 30 and the second soft keyboard 32 may be displayed depending upon situations.

In the illustrated embodiment, the characters for one input item are inputted in one input screen. The present invention is applicable to an arrangement in which a plurality of input boxes may be provided in one input screen and the characters are inputtable for a plurality of input items. In the arrangement, there may be displayed, in the first soft keyboard 30 or the second soft keyboard 32, the keys corresponding to one input item selected as an item for which the character are to be inputted, among the plurality of input items.

The type of the keys to be displayed in the first soft keyboard 30 may be two types or may be four or more types. Similarly, the type of the keys to be displayed in the second soft keyboard 32 may be three or more types.

The present invention may be applicable to an arrangement in which other soft keyboards are displayed in addition to the first soft keyboard and the second soft keyboard, namely, an arrangement in which the key groups are indicated in each of three or more display regions.

In the illustrated embodiment, the second soft keyboard 32 is made invalid (S618 in FIG. 6) and the sub screen of the LED display device 18 is erased (S620 in FIG. 6) when the screen is switched. Only one of the invalidation and the erasing may be implemented when the screen is switched. Alternatively, the illustrated embodiment may be modified such that none of the invalidation and the erasing is implemented.

What is claimed is:

1. An input device for inputting characters, comprising:
a touch panel unit having a first touch detecting region and a second touch detecting region each of which is capable of detecting a touch operation;
a first display control section configured to display, only a first operational-element group in the first touch detecting region and not to display a second operational-element group that is different from the first operational-element group in type, in the first touch detecting region, wherein the first display control section is configured to display only the second operational-element group in the second touch detecting region and not to display the first operation-element group in the second touch detecting region, each of the first operational-element group and the second operational-element group being composed of operational elements corresponding to one of letters, numerals and symbols as a type of a character,
wherein the first display control section is configured such that, when input of the characters for a certain input item is accepted in an instance where a plurality of types of the character for the certain input item exist each as a candidate of the type of the character for the certain input item which is displayable in one of the first touch detecting region and the second touch detecting region, one of the plurality of types of the character for the certain input item is displayed in the one of the first touch detecting region and the second touch detecting region,
wherein the input device further comprises a count section configured to count numbers of characters constituting a character string for each of the letters, the numerals, and the symbols which have been already inputted into an input box that is displayed on the touch panel unit together with the first operational-element group and the second operational-element group, and
wherein the first display control section is configured to display, in the one of the first touch detecting region and the second touch detecting region, one of the plurality of types of the character for the certain input item whose number counted by the count section is the largest.

2. The input device according to claim 1, configured such that the characters can be inputted for each of a plurality of input items and further comprising an input-acceptance-state establishing section configured to establish a state in which input of characters for any of the plurality of input items is acceptable, wherein the first display control section is configured to display, in the first touch detecting region, a type of the character corresponding to the state to be established by the input-acceptance-state establishing section.

3. The input device according to claim 1, wherein a type of a character of the first operational-element group displayed in the first touch detecting region is displayed in a first arrangement pattern while a type of a character of the second operational-element group displayed in the second touch detecting region is displayed in a second arrangement pattern different from the first arrangement pattern.

4. A computer-readable non-transitory recording medium containing a program executed by an input device for inputting characters, the input device comprising a touch panel unit having a first touch detecting region and a second touch detecting region, each of which is capable of detecting a touch operation, wherein the program includes:

a first display control section configured to display, only a first operational-element group in the first touch detecting region and not to display a second operational-element group that is different from the first operational-element group in type, in the first touch detecting region, wherein the first display control section is configured to display only the second operational-element group in the second touch detecting region and not to display the first operational-element group in the second touch detecting region, each of the first operational-element group and the second operational-element group being composed of operational elements corresponding to one of letters, numerals and symbols as a type of a character, wherein the first display control section is configured such that, when input of the characters for a certain input item is accepted in an instance where a plurality of types of the character for the certain input item exist each as a candidate of the type of the character for the certain input item which is displayable in one of the first touch detecting region and the second touch detecting region, one of the plurality of types of the character for the certain input item is displayed in the one of the first touch detecting region and the second touch detecting region, wherein the input device further comprises a count section configured to count numbers of characters constituting a character string for each of the letters, the numerals, and the symbols which have been already inputted into an input box that is displayed on the touch panel unit together with the first operational-element group and the second operational-element group, and wherein the first display control section is configured to display, in the one of the first touch detecting region and the second touch detecting region, one of the plurality of types of the character for the certain input item whose number counted by the count section is the largest.

5. The computer-readable non-transitory recording medium according to claim 4, wherein a type of a character of the first operational-element group displayed in the first touch detecting region is displayed in a first arrangement pattern while a type of a character of the second operational-element group displayed in the second touch detecting region is displayed in a second arrangement pattern different from the first arrangement pattern.

* * * * *